US009602658B2

United States Patent
Hazama

(10) Patent No.: US 9,602,658 B2
(45) Date of Patent: Mar. 21, 2017

(54) MARINE WIRELESS DEVICE AND RECORDED DATA PROCESSING METHOD

(71) Applicant: FURUNO Electric Company Limited, Nishinomiya, Hyogo (JP)

(72) Inventor: Takuto Hazama, Nishinomiya (JP)

(73) Assignee: FURUNO ELECTRIC COMPANY LIMITED, Hyogo (JP)

( * ) Notice: Subject to any disclaimer, the term of this patent is extended or adjusted under 35 U.S.C. 154(b) by 489 days.

(21) Appl. No.: 14/077,882

(22) Filed: Nov. 12, 2013

(65) Prior Publication Data

US 2014/0148133 A1 May 29, 2014

(30) Foreign Application Priority Data

Nov. 27, 2012 (JP) .................................. 2012-258698

(51) Int. Cl.
*H04M 11/10* (2006.01)
*H04M 3/42* (2006.01)

(52) U.S. Cl.
CPC .. *H04M 3/42221* (2013.01); *H04M 2203/301* (2013.01)

(58) Field of Classification Search
None
See application file for complete search history.

(56) References Cited

U.S. PATENT DOCUMENTS 8,325,906 B2 * 12/2012 Fullarton .............. H04M 3/436
379/210.01
8,422,646 B2 * 4/2013 Gray ................... H04L 12/5815
379/88.22

(Continued)

FOREIGN PATENT DOCUMENTS

JP S58-164332 A 9/1983
JP 05-014223 A 1/1993

(Continued)

OTHER PUBLICATIONS

Office Action of the corresponding Japanese Patent Application No. 2012-258698, dated Jul. 26, 2016.

*Primary Examiner* — Shantell L Heiber
(74) *Attorney, Agent, or Firm* — Global IP Counselors, LLP

(57) ABSTRACT

A marine wireless device includes a calling unit, a response unit, a communication establishment unit, a call processor, a condition memory unit, and a recorded data processor. The calling unit sends call information requesting the start of communication. The response unit sends response information with respect to the call information sent by a communication partner. The communication establishment unit receives the response information from the communication partner and establishes communication with the communication partner. The call processor executes a voice call with the communication partner with whom the communication establishment unit has established communication. The call memory unit stores as recorded data a voice call executed by the call processor. The condition memory unit stores specific data processing conditions related to recorded data. The recorded data processor varies the processing related to recorded data according to the data processing conditions.

16 Claims, 6 Drawing Sheets

(56) References Cited

U.S. PATENT DOCUMENTS

| | | | | |
|---|---|---|---|---|
| 2002/0160751 A1* | 10/2002 | Sun | .................... | H04M 1/6505 |
| | | | | 455/412.1 |
| 2004/0137945 A1* | 7/2004 | Takagi | .................. | H04M 1/656 |
| | | | | 455/558 |

FOREIGN PATENT DOCUMENTS

| JP | 06-030110 A | 2/1994 |
|---|---|---|
| JP | 2005-252632 A | 9/2005 |
| JP | 2006-165846 A | 6/2006 |

* cited by examiner

| Associated Information for Recorded Data ||||
| MMSI (communication partner) | Call start | Speaker | Importance |
| --- | --- | --- | --- |
| ID03 | 17:30 | only host device | |
| ID04 | 17:45 | only partner | ✓ |
| ID05 | 17:55 | both | ✓ |
| ID07 | 18:05 | both | |

*FIG. 3(a)*

| Data Processing Conditions ||
| --- | --- |
| MMSI (communication partner) | ID02, ID05, ID06 |
| Speaker | Only utterances of communication partner |
| Other | Urgency |

*FIG. 3(b)*

MARINE WIRELESS DEVICE AND RECORDED DATA PROCESSING METHOD

CROSS-REFERENCE TO RELATED APPLICATIONS

This application claims priority to Japanese Patent Application No. 2012-258698 filed on Nov. 27, 2012. The entire disclosure of Japanese Patent Application No. 2012-258698 is hereby incorporated herein by reference.

BACKGROUND

Field of the Invention

The present invention relates primarily to a marine wireless device installed in a boat, ship, etc.

Background Information

There are conventional marine wireless devices for making voice calls between vessels or between a vessel and a port. With a marine wireless device, a voice call is usually recorded automatically, and the recorded data stored for future reference.

In the past, a device that detected the level of a transmitted or received voice signal was used to automatically stop the recording at the end of a voice call. The device stopped recording when a voice of at least a specific signal level was not detected for a specific length of time.

With Patent Literature 1 (Japanese Laid-Open Patent Application No. 558-164332), as discussed below, recording is automatically started and stopped. The marine wireless device in Patent Literature 1 includes a receiver for receiving signals from a communication partner, a transmitter for sending signals to a communication partner, and a recording controller.

The recording controller receives a squelch signal from the inside upon receiving a signal from a communication partner. The recording controller receives a press signal from the inside when a signal is sent to the communication partner. The recording controller begins recording at the point when a squelch signal or press signal has been received. After this, the recording controller stops the recording if no squelch signal or press signal is received for a specific length of time (measured with a timer). Thus using a squelch signal, a press signal, a timer, etc., allows recording to be performed with fewer unrecorded portions.

SUMMARY

Nevertheless, even with the configuration in Patent Literature 1, the storage capacity of the memory unit is used up because there is so much recorded data in a voice file. In this case, usually the old recorded data is deleted and new recorded data is stored.

However, old recorded data is not necessarily useless, and important recorded data sometimes ends up being automatically deleted. The user therefore has to periodically clean up the memory unit and delete any unnecessary recorded data. This processing imposes a burden on the user.

Also, with a marine wireless device, recorded data is produced for every voice call (or every utterance). Therefore, there has been a need for a method for handling a large quantity of recorded data together.

The present invention was conceived in light of the above situation, and the primary object thereof is to provide a marine wireless device that efficiently handles recorded data of voice calls.

The problem to be solved by the present invention is as set forth above, and the means for solving this problem will now be described, along with the effect thereof.

A first aspect of the present invention provides a marine wireless device with the following configuration. Specifically, this marine wireless device includes a calling unit, a response unit, a communication establishment unit, a call processor, a call memory unit, a condition memory unit, and a recorded data processor. The calling unit sends call information requesting a start of communication. The response unit sends response information with respect to the call information sent by a communication partner. The communication establishment unit receives the response information from the communication partner and establishes the communication with the communication partner. The call processor executes a voice call with the communication partner with whom the communication establishment unit has established the communication. The call memory unit stores as recorded data the voice call executed by the call processor. The condition memory unit stores specific data processing conditions related to the recorded data. The recorded data processor varies the processing related to the recorded data according to the data processing conditions.

Consequently, the proper processing can be performed on recorded data for a voice call by setting the data processing conditions according to the user's preferences or usage mode, for example.

With the above marine wireless device, it is preferable if the recorded data processor switches between producing the recorded data for every utterance, and producing the recorded data in which are collected utterances made in a single communication according to the data processing conditions.

Consequently, by setting the proper data processing conditions, recorded data can be produced for every utterance for a type of call in which unnecessary utterances are selected and deleted after recording, for example. Meanwhile, for a type of call in which deletion is not performed after every utterance, recorded data can be produced in which are collected the utterances made in a single communication.

With the above-mentioned marine wireless device, it is preferable if the recorded data processor varies priority in which the recorded data is deleted between the recorded data that matches the data processing conditions and the recorded data that does not match the data processing conditions.

Consequently, by setting the proper data processing conditions, important voice calls can be prevented from being automatically deleted. Therefore, less work is required of the user in terms of selecting and deleting recorded data, and it is possible to avoid situations in which important recorded data ends up being deleted through human error.

With the above-mentioned marine wireless device, it is preferable if the recorded data processor varies the priority in which the recorded data is deleted by varying processing performed in storing the recorded data in the call memory unit, between the recorded data that matches the data processing conditions and the recorded data that does not match the data processing conditions.

Consequently, the recorded data processor stores important recorded data with auxiliary information attached, or separates it into folders into which it is recorded, for example. Therefore, the user can ascertain at a glance the importance of each set of recorded data.

With the above-mentioned marine wireless device, it is preferable if the recorded data processor deletes the recorded data stored in the call memory unit by taking into account whether or not the recorded data matches the data processing conditions.

Consequently, whether or not data processing conditions are satisfied is confirmed before the recorded data is deleted, so the latest data processing conditions can be used to evaluate the importance of recorded data.

It is preferable if the above-mentioned marine wireless device has the following configuration. Specifically, the call memory unit separately stores utterances from the communication partner to a host device, and utterances from the host device to the communication partner as the recorded data. The recorded data processor deletes voice recorded data from the host device to the communication partner preferentially over voice recorded data from the communication partner to the host device.

In general, the user of the host device will want to listen again to what was said by a communication partner more than to what the user said. Therefore, the above configuration allows recorded data to be automatically cleaned up so as to match this preference.

With the above-mentioned marine wireless device, it is preferable if the recorded data processor determines whether or not to store the voice call in the call memory unit according to whether or not there is a match with the data processing conditions.

This prevents voice calls that obviously do not need to be recorded from ending up being recorded. Also, even if the call memory unit has a small storage capacity, that storage capacity can be utilized effectively.

With the above-mentioned marine wireless device, it is preferable if the condition memory unit stores the data processing conditions in which identification information about a wireless station of the communication partner is a condition.

Consequently, since the importance of a voice call is usually determined by the communication partner, the recorded data can be properly processed by using the communication partner as a data processing condition. For example, the system may be configured so that recorded data for voice calls with previously designated communication partners will not be automatically deleted.

The above-mentioned marine wireless device is preferably configured as follows. Specifically, this marine wireless device includes an interface unit operated by a user. The condition memory unit adds the identification information about the wireless station of the communication partner to the data processing conditions based on a command received from the interface unit during the voice call with a communication partner.

Consequently, when the importance of a communication partner is learned in the middle of a voice call, a setting to that effect can be made during the voice call.

With the above-mentioned marine wireless device, it is preferable if the condition memory unit stores the data processing conditions using information indicating whether or not the voice call is urgent.

Consequently, since a voice call with a high urgency is usually important, the priority of deleting recorded data for voice calls with high urgency can be lowered, for example.

The above-mentioned marine wireless device is preferably configured as follows. Specifically, this marine wireless device includes an interface unit operated by a user. The recorded data processor performs processing related to the recorded data based on the data processing conditions and a command received from the interface unit during the voice call with the communication partner.

Consequently, if the importance of a call content is learned in the middle of a voice call, special processing (such as processing to preferentially delete specific recorded data) can be performed on the recorded data for that voice call.

A second aspect of the present invention provides the following recorded data processing method for a marine wireless device. Specifically, this recorded data processing method includes sending call information requesting a start of communication, sending response information with respect to the call information sent by a communication partner, receiving the response information from the communication partner and establishing the communication with the communication partner, executing a voice call with the communication partner that has been established, storing as recorded data the voice call that has been executed, and varying processing related to the recorded data according to the data processing conditions.

Consequently, the proper processing can be performed on the recorded data of a voice call by setting the data processing conditions according to the user's preferences or usage mode, for example.

BRIEF DESCRIPTION OF THE DRAWINGS

Referring now to the attached drawings which form a part of this original disclosure:

FIGS. 3(a) and 3(b) are tables of information added to recorded data, and data processing conditions;

DETAILED DESCRIPTION OF EMBODIMENTS

Figure 1:
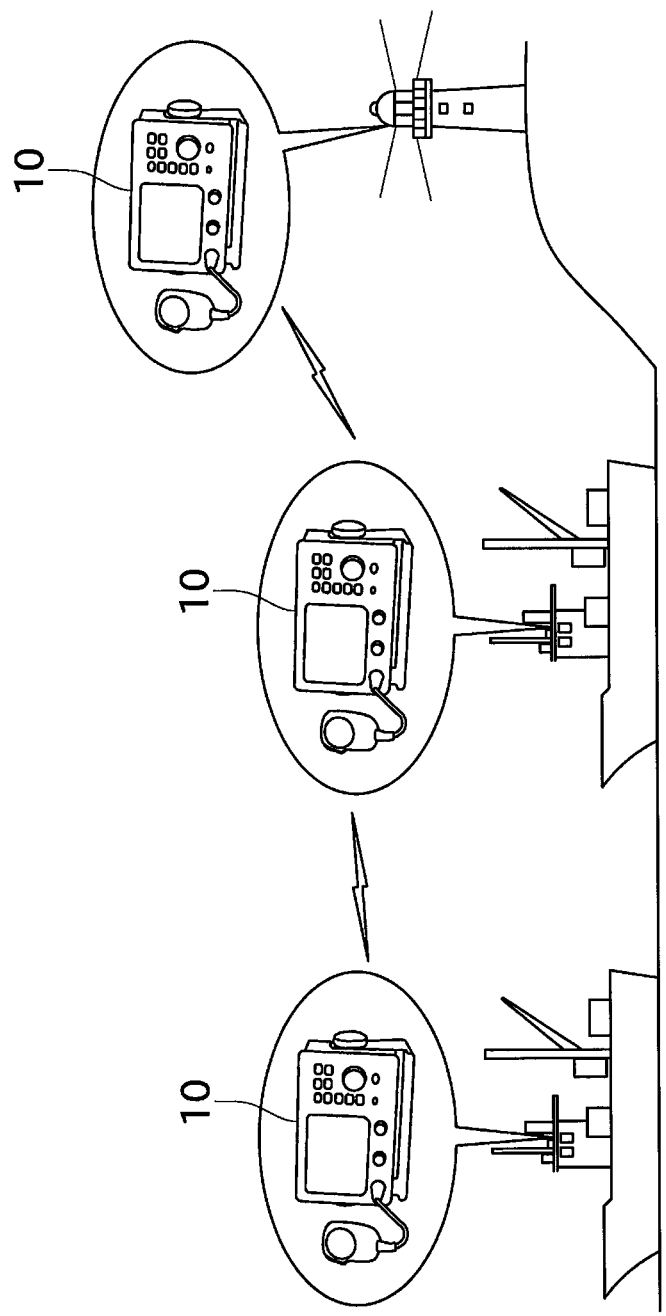
FIG. 1 is a simplified diagram of a usage example of the marine wireless device pertaining to an embodiment of the present invention.
Figure 2:
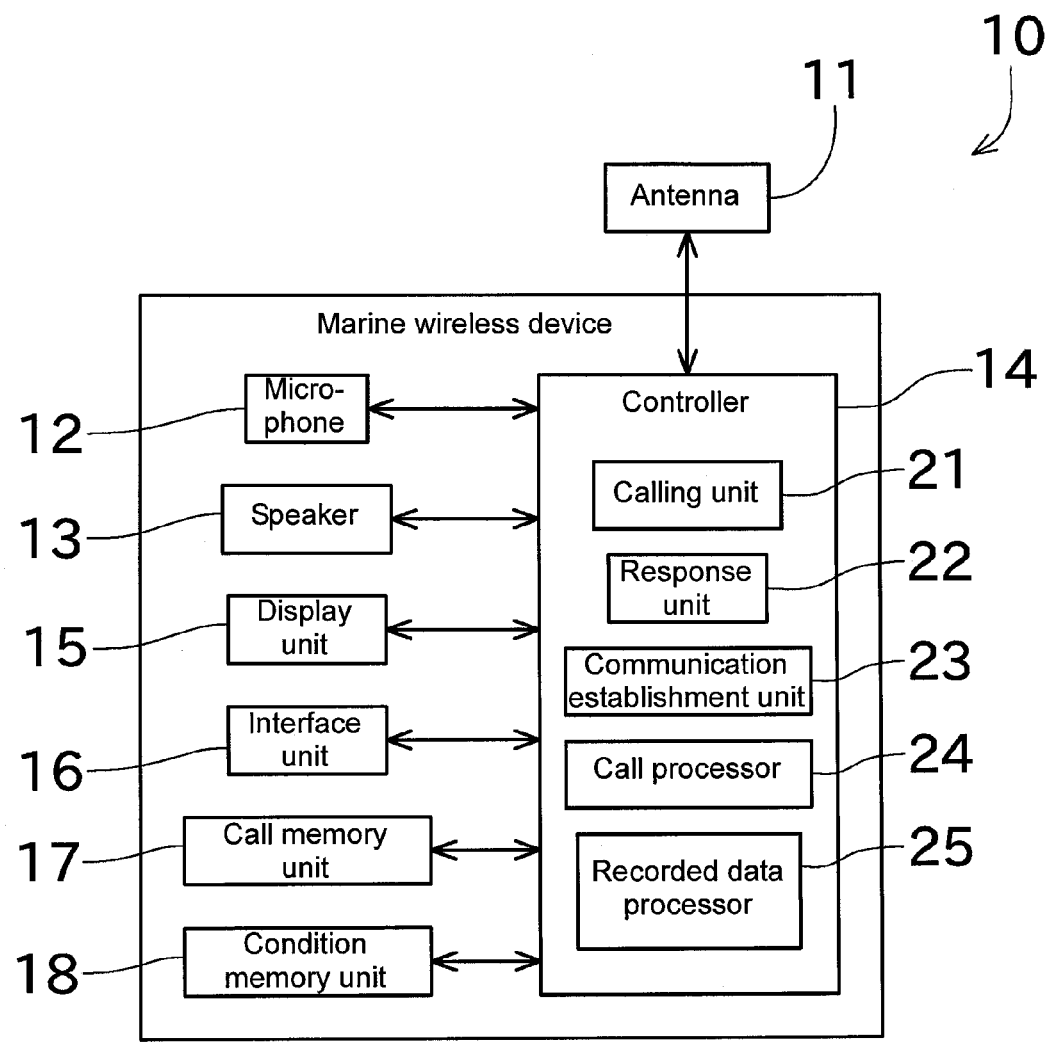
FIG. 2 is a block diagram of the configuration of a marine wireless device.

A preferred embodiment will now be explained with reference to the drawings. It will be apparent to those skilled in the art from this disclosure that the following descriptions of the embodiment are provided for illustration only and not for the purpose of limiting the invention as defined by the appended claims and their equivalents. FIG. 1 is a simplified diagram of a usage example of the marine wireless device pertaining to an embodiment of the present invention. FIG. 2 is a block diagram of the configuration of a marine wireless device.

A marine wireless device 10 performs DSC (digital selective calling) communication, and is used to make voice calls between vessels or between a vessel and the land. As shown in FIG. 1, the marine wireless device 10 is installed in a ship, a boat, a lighthouse, a port, etc.

As shown in FIG. 2, the marine wireless device 10 includes an antenna 11, a microphone 12, a speaker 13, a controller 14, a display unit 15, an interface unit 16, a call memory unit 17, and a condition memory unit 18.

The antenna 11 sends specific information and user utterances to other marine wireless devices 10, and receives specific information and utterances of the communication partner from other marine wireless devices 10.

The microphone 12 acquires user utterances from the host vessel and converts them into electrical signals. The speaker 13 takes the utterances (electrical signals) of the communication partner received by the antenna 11 and outputs them as audio.

The controller 14 performs various kinds of control and processing related to the marine wireless device 10. For instance, the controller 14 performs control related to the transmission and reception of information using the antenna 11, processing for recording voice calls, and attendant processing. The configuration of the controller 14 will be discussed in detail later.

The display unit 15 is made up of a liquid crystal display or the like, and displays information related to voice calls produced by the controller 14. For example, the display unit 15 may display a list of communication partners requesting voice calls, communication partners in the midst of voice calls, call durations, etc.

The interface unit 16 includes keys provided to the marine wireless device 10. The user can use the interface unit 16 to send instructions to the marine wireless device 10 (controller 14). The display unit 15 and the interface unit 16 can be configured as touch panels.

The call memory unit 17 records voice calls with a communication partner as recorded data. In this embodiment, there are two ways that voice calls are recorded. The first is a method in which one set of recorded data (voice file) is produced for every utterance from the host device or communication partner. The second is a method in which one set of recorded data is produced in which a plurality of utterances made in a single communication are collected.

As shown in FIG. 3(a), the call memory unit 17 stores various kinds of information that is associated with a single set of recorded data (associated information, identifier). More specifically, information including of "MMSI," "call start," "speaker," and "important" are recorded for every set of recorded data.

"MMSI" is an identification number for a wireless station in DSC communication. That is, the MMSI of a communication partner is stored. "Call start" is the clock time at which a voice call is started. "Speaker" is the person uttering the recorded data. When recording is done with the first method above, recorded data is produced in which the speaker is either "only the host device" or "only the partner," and when recording is done with the second method above, recorded data is produced in which the speaker is "both." "Important" means that the importance of recorded data shown below is noted. A check mark indicates that the recorded data at that location is important.

Data processing conditions for determining the importance of recorded data is stored ahead of time in the condition memory unit 18. More specifically, as shown in FIG. 3(b), three categories of data processing conditions are set: "MMSI," "speaker," and "other."

In "MMSI" are set data processing conditions based on the MMSI. If a voice call is made with the MMSI given in this category, the recorded data of this voice call is deemed important. If, for example, the user is part of a group of other vessels sailing together, the MMSIs of these vessels are pre-registered. Consequently, the recorded data of voice calls made within the group is deemed important.

In "speaker" are set data processing conditions based on the speaker of the recorded data. In FIG. 3(b), "only utterances of the communication partner" is shown, and this indicates that the recorded data is deemed important when this recorded data is made up of only the utterances of a communication partner. Recorded data made up of only the utterances of a communication partner (recorded data of a voice from a communication partner to the host device) is produced when recording is done with the first method above.

In "other" are given data processing conditions other than those mentioned above. In FIG. 3(b), "urgency" is shown, and this indicates that the importance of the recorded data is determined according to the urgency of the voice call. More specifically, in DSC communication, information sent and received during a voice call can include information telling the user that the "call is urgent." Recorded data for a voice call including "call is urgent" is deemed to be important. The "other" category is not limited to data processing conditions related to urgency, and a variety of conditions can be set.

Figure 4:
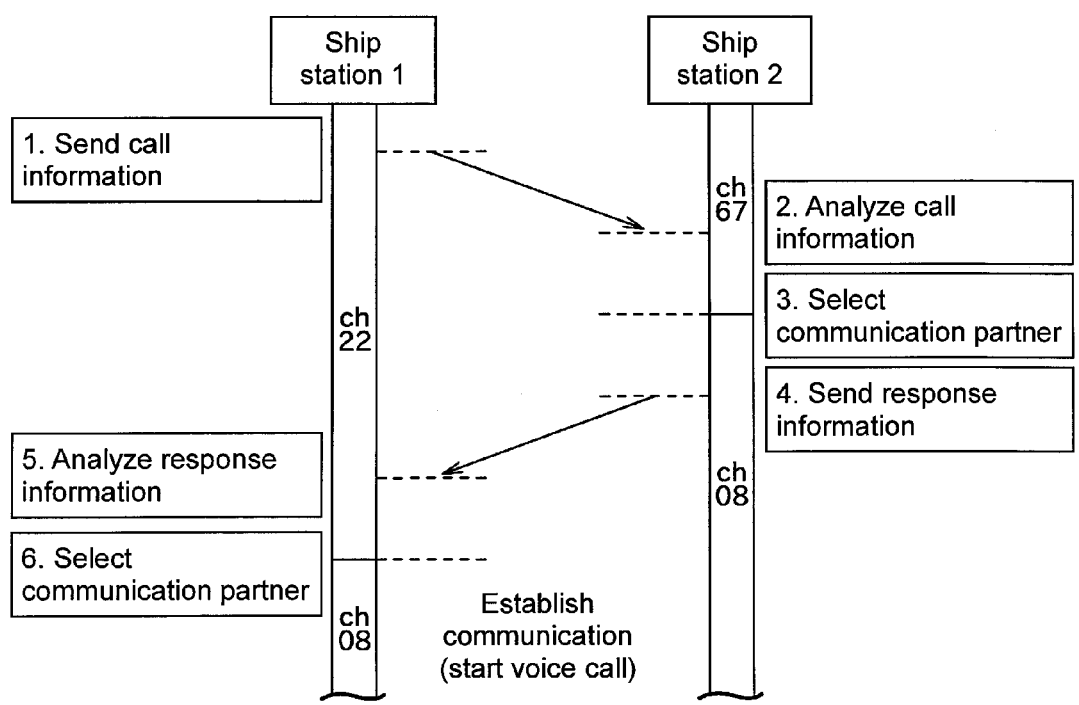
FIG. 4 is a sequence diagram of the processing performed in starting a voice call between two marine wireless devices.

Next, the processing performed by the controller 14 in order to establish a voice call will be described through reference to FIG. 4. FIG. 4 is a sequence diagram of the processing performed in starting a voice call between two marine wireless devices 10. As the components for establishing (executing) a voice call, the controller 14 includes a calling unit 21, a response unit 22, a communication establishment unit 23, and a call processor 24.

An example in which a ship station 1 invites a ship station 2 to a voice call. Let us assume that the marine wireless device 10 described above is installed on each of the ship station 1 and the ship station 2.

The user of the ship station 1 operates the interface unit 16 while referring to the display unit 15, thereby instructing a voice call to the ship station 2.

Upon receiving this instruction, the controller 14 of the ship station 1 produces call information necessary for calling (inviting) a voice call using DSC communication. This call information includes the MMSI of the host device (ship station 1), the MMSI of the communication partner (ship station 2), whether or not the call is urgent, the channel (frequency, etc.) to be used for communication, and so forth. Instead of using the MMSI of the communication partner, a plurality or all of the wireless stations may be designated and a call made to a plurality of ship stations. The controller 14 (calling unit 21) of the ship station 1 sends the ship station 2 the call information thus produced (sequence number 1).

The ship station 2 that has received this call information analyzes the call information (sequence number 2). If the ship station 2 has received call information from a plurality of ship stations, a list of the ship stations is displayed on the display unit 15 and one is selected by the user. The controller 14 (communication establishment unit 23) receives notification that the user has selected the ship station 1 (sequence number 3), and sets the channel used for transmission to the channel designated by the call information. The controller 14 (response unit 22) of the ship station 2 then sends response information (sequence number 4) to the ship station 1 selected by the user. This response information includes the MMSI of the host device (ship station 2), the MMSI of the communication partner (ship station 1), etc.

The ship station 1 that has received this response information analyzes the response information (sequence number 5). The controller 14 of the ship station 1 here displays on the display unit 15 a list of ship stations that have received call information or response information, just as at the ship station 2, and the user makes a selection (sequence number 6). The controller 14 (communication establishment unit 23) of the ship station 1, in response to the user selecting the ship station 2, sets the channel used for transmission to the channel designated with the call information itself. The above procedure establishes communication between the ship station 1 and the ship station 2.

A voice call is then realized when the call processors 24 of the ship station 1 and the ship station 2 convert the user's utterances into electrical signals and send and receive these. Also, the controller 14 starts recording the voice call. The squelch signal and press signal described in the patent literature can be used to start and stop this recording.

Figure 5A:
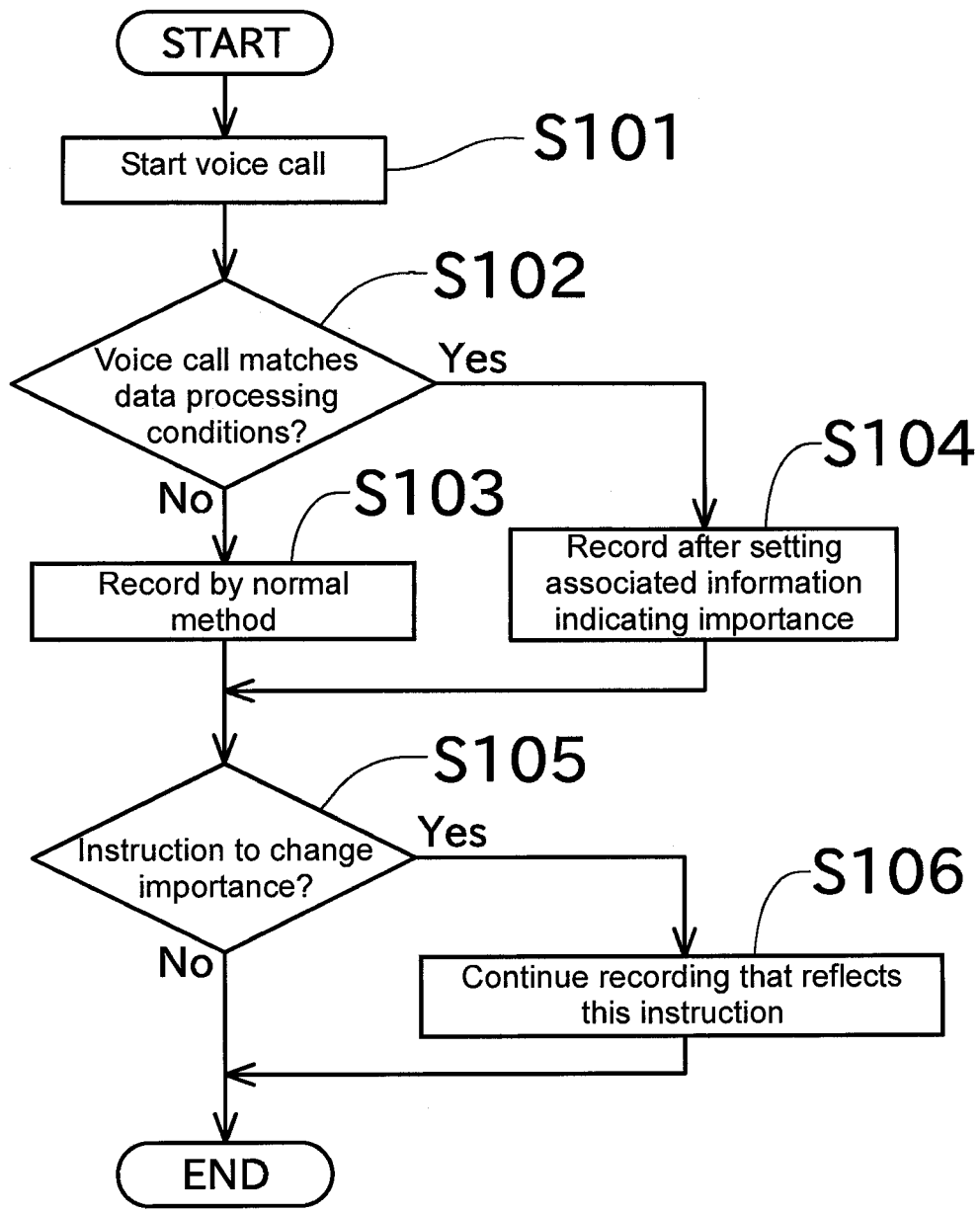
FIGS. 5(a) and 5(b) are flowcharts of the processing performed by the recorded data processor.
Figure 5B:
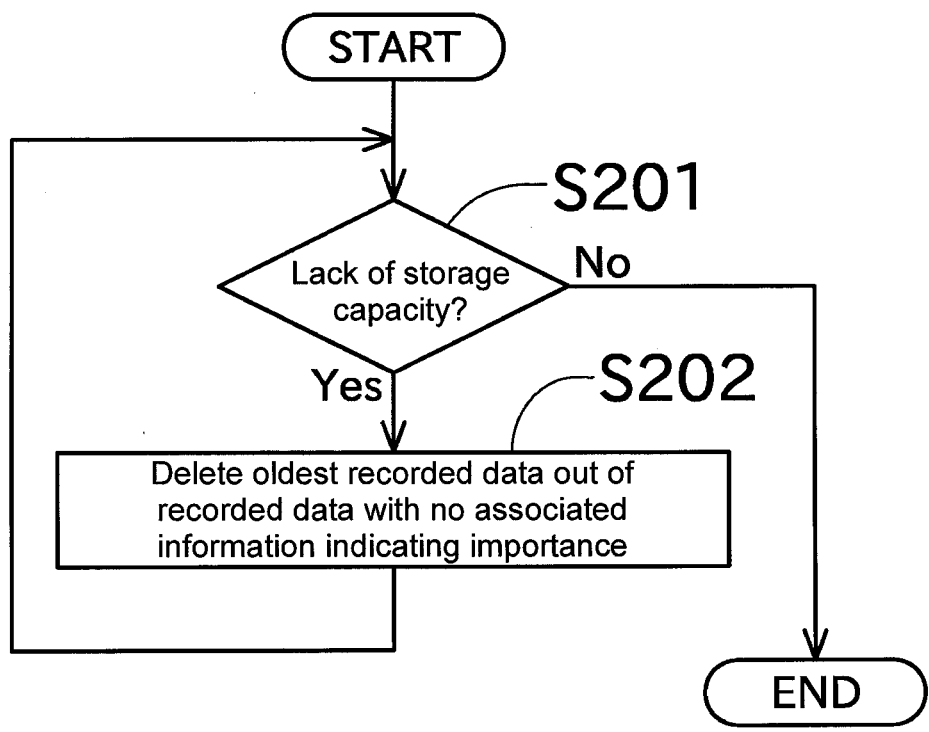

Next, the processing performed by the controller 14 according to the importance of the recorded data will be described through reference to FIGS. 5(*a*) and 5(*b*). FIGS. 5(*a*) and 5(*b*) are flowcharts of the processing performed by a recorded data processor 25. The controller 14 includes the recorded data processor 25, which performs processing according to the importance of recorded data.

First, the processing performed by the recorded data processor 25 after the start of the voice call will be described through reference to FIG. 5(*a*). When the voice call begins (S101), the recorded data processor 25 accesses the condition memory unit 18 and determines whether or not the voice call that has begun matches the data processing conditions (S102).

If the voice call matches the data processing conditions, the recorded data processor 25 starts recording the voice call by a normal method (S103). A "normal method" means that the recording is carried out without setting any associated information (FIG. 3(*a*) discussed above) indicating importance. The controller 14 stores the MMSI of the communication partner and so forth as associated information about the recorded data along with the recorded data based on the above-mentioned call information and response information.

Meanwhile, if the voice call matches the data processing conditions, the recorded data processor 25 starts recording by setting associated information indicating importance (FIG. 3(*a*) discussed above) (S104). Naturally, even in this case the MMSI of the communication partner and so forth are stored along with the recorded data as associated information. That is, the recorded data processor 25 varies the processing performed in storing the recorded data depending on whether or not there is a match to the data processing conditions.

Also, if there is an instruction from the user to change the importance during voice recording (S105), the recorded data processor 25 carries out this instruction (S106). More specifically, the user can undo the setting of associated information indicating importance by issuing an instruction during a voice call, for a voice call deemed to be important in step S102. Conversely, for a voice call deemed not to be important in S102, the user can also set associated information indicating importance by issuing an instruction during the voice call. Furthermore, new communication partners are registered in the condition memory unit 18 at this timing (during a voice call).

Performing processing as above allows the importance to be determined according to a user instruction or preset data processing conditions, and allows recorded data to be produced along with associated information indicating importance. Furthermore, associated information indicating importance can also be set or unset after the recording as ended.

Next, the processing performed by the recorded data processor 25 when there is not enough storage capacity in the call memory unit 17 will be described through reference to FIG. 5(*b*).

If there is not enough storage capacity in the call memory unit 17 (S201), the recorded data processor 25 deletes older recorded data in order to produce newer recorded data. More specifically, the recorded data processor 25 deletes the oldest recorded data out of the recorded data with no associated information indicating importance (S202). The recorded data processor 25 then deletes recorded data until there is once again enough storage capacity in the call memory unit 17.

Performing the above processing prevents important recorded data from being deleted automatically. In other words, if recorded data is important, its priority for deletion is lowered.

As described above, the marine wireless device 10 in this embodiment includes the calling unit 21, the response unit 22, the communication establishment unit 23, the call processor 24, the call memory unit 17, the condition memory unit 18, and the recorded data processor 25. The calling unit 21 sends out call information requesting the start of communication. The response unit 22 sends out response information with respect to the call information sent by a communication partner. The communication establishment unit 23 receives response information from the communication partner and establishes communication with that communication partner. The call processor 24 executes a voice call with the communication partner for whom the communication establishment unit 23 has established communication. The call memory unit 17 stores as recorded data the voice calls executed by the call processor. The condition memory unit 18 stores specific data processing conditions related to recorded data. The recorded data processor 25 varies the associated information of recorded data according to the data processing conditions.

Also, a configuration in which the recorded data processor 25 varies processing related to recorded data based on data processing conditions corresponds to the present invention, and various modes are conceivable in addition to varying the associated information of recorded data as in the above embodiment. An example of this will now be described.

When the recorded data is determined to be important, the recorded data processor 25 can modify the storage area (such as a folder), rather than the associated information. Also, a specific character string may be added to the name of the recorded data if the recorded data is determined to be important.

The recorded data processor 25 may be configured such that the above-mentioned two recording methods are switched according to specific data processing conditions.

In the above embodiment, the recorded data processor 25 determines whether or not there is a match to the data processing conditions during the production of recorded data, and performs processing accordingly. In contrast, the following processing may be performed. Specifically, the recorded data processor 25 may be configured such that the priority of deletion (the order of deletion) is determined by taking into account the data processing conditions during the deletion of recorded data, rather than performing processing according to the data processing conditions during the production of recorded data.

The recorded data processor 25 may be configured such that voice calls that are not important are not recorded in the first place. The importance discussed above was binary, either important or not important, but an importance of three or more stages may also be used.

The recorded data processor 25 is configured to vary the priority of deletion of recorded data based on the data processing conditions, but may be configured to perform other processing. For instance, a backup of just recorded data that matches the data processing conditions can be produced automatically.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts.

While only a preferred embodiment has been chosen to illustrate the present invention, it will be apparent to those skilled in the art from this disclosure that various changes and modifications can be made herein without departing from the scope of the invention as defined in the appended claims. Furthermore, the foregoing descriptions of the embodiment according to the present invention are provided for illustration only, and not for the purpose of limiting the invention as defined by the appended claims and their equivalents.

What is claimed is:

1. A marine wireless device comprising:
   a calling unit configured to send call information requesting a start of communication for receipt by a communication partner;
   a response unit configured to send a response communication in response to other call information received from another communication entity requesting communication with the marine wireless device;
   a communication establishment unit configured to receive response information from the communication partner and establish the communication with the communication partner;
   a call processor configured to execute a voice call with the communication partner with whom the communication establishment unit has established the communication;
   a call memory unit configured to store as recorded data the voice call executed by the call processor, and further configured to separately store utterances from the communication partner to a host device and utterances from the host device to the communication partner as the recorded data;
   a condition memory unit configured to store specific data processing conditions related to the recorded data; and
   a recorded data processor configured to vary processing related to the recorded data according to the data processing conditions, and further configured to delete voice recorded data from the host device to the communication partner preferentially over voice recorded data from the communication partner to the host device.

2. The marine wireless device according to claim 1, wherein
   the recorded data processor is further configured to switch between producing the recorded data for every utterance, and producing the recorded data in which are collected utterances made in a single communication according to the data processing conditions.

3. The marine wireless device according to claim 1, wherein
   the recorded data processor is further configured to vary priority in which the recorded data is deleted between the recorded data that matches the data processing conditions and the recorded data that does not match the data processing conditions.

4. The marine wireless device according to claim 3, wherein
   the recorded data processor is further configured to vary the priority in which the recorded data is deleted by varying processing performed in storing the recorded data in the call memory unit, between the recorded data that matches the data processing conditions and the recorded data that does not match the data processing conditions.

5. The marine wireless device according to claim 4, wherein
   the recorded data processor is further configured to delete the recorded data stored in the call memory unit by taking into account whether or not the recorded data matches the data processing conditions.

6. The marine wireless device according to claim 3, wherein
   the recorded data processor is further configured to determine whether or not to store the voice call in the call memory unit according to whether or not there is a match with the data processing conditions.

7. The marine wireless device according to claim 3, wherein
   the condition memory unit is further configured to store the data processing conditions in which identification information about a wireless station of the communication partner is a condition.

8. The marine wireless device according to claim 3, wherein
   the condition memory unit is further configured to store the data processing conditions using information indicating whether or not the voice call is urgent.

9. The marine wireless device according to claim 3, further comprising
   an interface unit configured to be operated by a user,
   the recorded data processor being further configured to perform the processing related to the recorded data based on the data processing conditions and a command received from the interface unit during the voice call with the communication partner.

10. The marine wireless device according to claim 1, wherein
    the recorded data processor is further configured to determine whether or not to store the voice call in the call memory unit according to whether or not there is a match with the data processing conditions.

11. The marine wireless device according to claim 1, wherein
    the condition memory unit is further configured to store the data processing conditions in which identification information about a wireless station of the communication partner is a condition.

12. The marine wireless device according to claim 11, further comprising
    an interface unit configured to be operated by a user,
    the condition memory unit being further configured to add the identification information about the wireless station of the communication partner to the data processing conditions based on a command received from the interface unit during the voice call with the communication partner.

13. The marine wireless device according to claim 1, wherein
    the condition memory unit is further configured to store the data processing conditions using information indicating whether or not the voice call is urgent.

14. The marine wireless device according to claim 1, further comprising
an interface unit configured to be operated by a user,
the recorded data processor being further configured to perform the processing related to the recorded data based on the data processing conditions and a command received from the interface unit during the voice call with the communication partner.

15. A recorded data processing method for a marine wireless device, the method comprising:
sending call information requesting a start of communication for receipt by a communication partner;
sending a response communication in response to other call information received from another communication entity requesting communication with the marine wireless device;
receiving response information from the communication partner and establishing the communication with the communication partner;
executing a voice call with the communication partner that has been established;
storing as recorded data the voice call that has been executed;
separately storing utterances from the communication partner to the marine wireless device and utterances from the marine wireless device to the communication partner as the recorded data;
varying processing related to the recorded data according to the data processing conditions; and
deleting voice recorded data from the marine wireless device to the communication partner preferentially over voice recorded data from the communication partner to the marine wireless device.

16. The recorded data processing method according to claim 15, further comprising
varying priority in which the recorded data is deleted between the recorded data that matches the data processing conditions and the recorded data that does not match the data processing conditions.

* * * * *